March 19, 1974  R. J. McMANIMIE ET AL  3,798,288
ETHYLENE/PROPYLENE BLOCK COPOLYMERS
Filed June 11, 1959
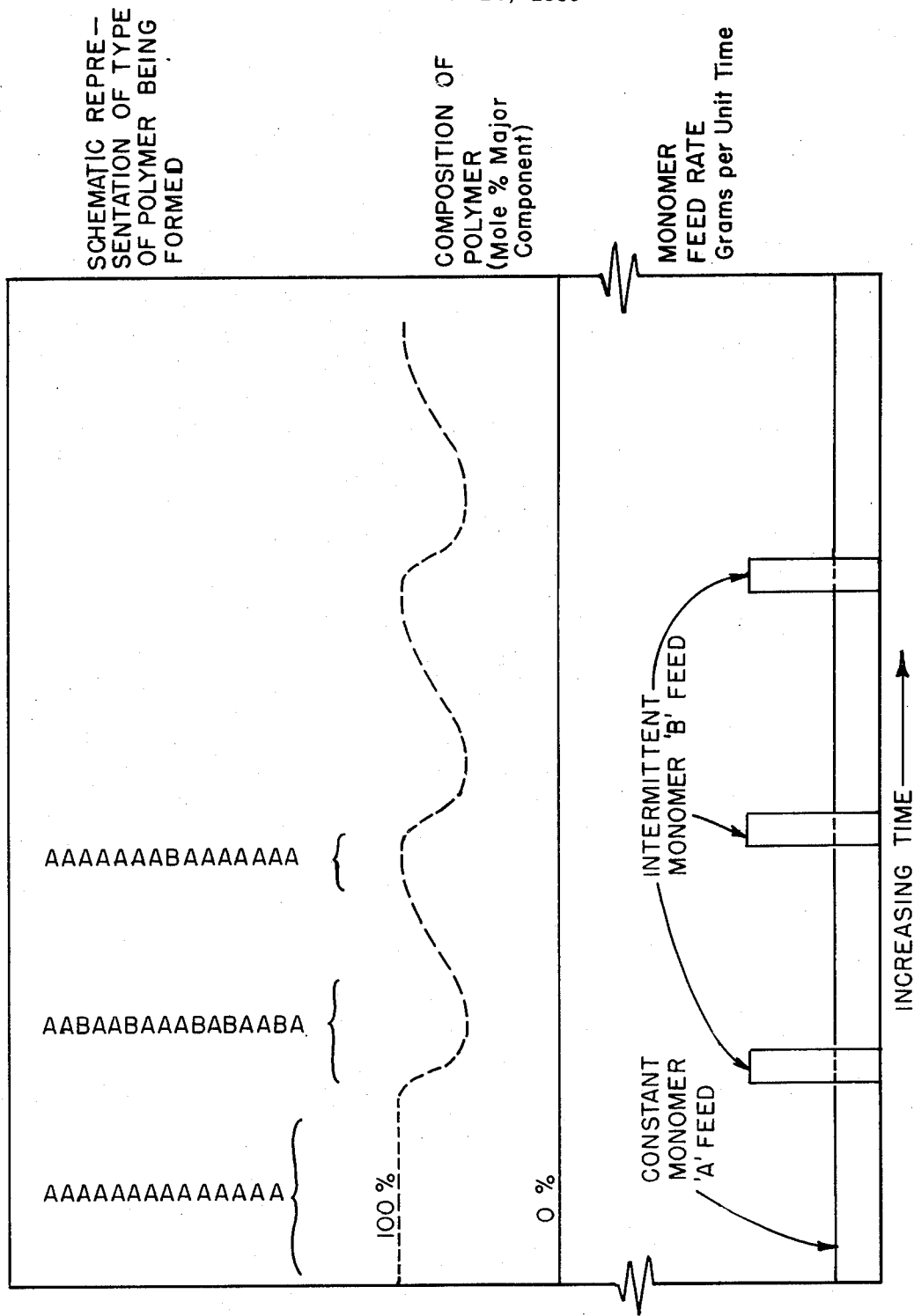
INVENTOR.
Robert J. McManimie
William R. Richard Jr.
BY Edward L. Doerr
ATTORNEY or AGENT

United States Patent Office 3,798,288
Patented Mar. 19, 1974

3,798,288
ETHYLENE/PROPYLENE BLOCK COPOLYMERS
Robert J. McManimie and William R. Richard, Jr., Dayton, Ohio, assignors to Monsanto Company, St. Louis, Mo.
Filed June 11, 1959, Ser. No. 819,649
Int. Cl. C08f 1/42, 15/04
U.S. Cl. 260—878 B
9 Claims

ABSTRACT OF THE DISCLOSURE

A method of preparing block copolymers from ethylene and propylene monomers which comprises alternately polymerizing one of said monomers and a mixture of said monomers in the presence of a catalyst comprising a vanadium halide and an aluminum alkyl compound.

---

The present invention relates to a new technique for the polymerization of ethylene and propylene in the presence of low-pressure polymerization catalysts suitable therefor, and to the resulting polymers.

It has heretofore been known that linear polyethylene can be prepared by polymerization of ethylene over low-pressure polymerization catalysts, notably Ziegler catalysts, which will be described in more detail hereinbelow. It has also been known that linear polypropylene can be prepared by polymerizing propylene over such catalysts. Both of the foregoing polymers have defects rendering them unsuitable for many uses, as will be discussed more fully hereinbelow. In general, the present invention combines some measure of the good low temperature properties of polyethylene and some measure of the good high temperature properties of polypropylene together into one material.

Previous researchers have attempted to combine the properties of linear polyethylene and isotactic polypropylene by simply blending polyethylene and polypropylene together by mechanical means. The polymer blends are obtained as the result of an extra processing step, e.g., the milling or mixing process, which requires the expenditure of money for additional equipment, mechanical force, heat and power, and, of course labor. Polyblends are unsuitable for many applications due to their adverse solubility or extractability properties when used with various solvent systems, particularly when containing a rubber component.

The present invention is directed to a method of controlling the low pressure interpolymerization of ethylene and propylene to prepare block type polymers. Our novel technique provides for intermittently varying the concentration of at least one of the monomers from substantially zero up to substantial amounts. The other monomer can be supplied at a constant addition rate, or can be added alternately and intermittently with the former monomer, or both monomers can be added intermittently. The concentration of monomers can suitably be regulated by intermittent injection during polymerization, i.e., by the use of monomer feed valves which are automatic electrically controlled by timers which can be preset to function at any desired time.

Polymer prepared by our new process is characterized by alternating "blocks" of ethylene-propylene copolymer with blocks of homopolymer of the selected monomer, e.g., polyethylene blocks, or polypropylene blocks. Block polymers are commonly understood to be copolymers consisting of a long sequence of one polymer followed by a long sequence of another polymer. The block polymers resulting from the practice of our invention have a long chain of homopolymer followed by a long chain of heteropolymer, wherein this pattern can be repeated until the desired molecular weight of the block copolymer is obtained.

The product prepared by our new process has definitely superior properties to the conventional copolymer prepared by feeding two monomers concurrently, or concomitantly, or by feeding a single stream made up of a monomer mixture. The advantageous properties of the properties of the polymer prepared by our invention in the use of alternating intermittent feed can not be achieved by simply preparing a polyblend from the respective homopolymers. The differences in product quality can be demonstrated by comparing product properties, as illustrated herein, or by submitting polymer samples to extraction procedures.

The properties of low pressure polyethylene and polypropylene are to a considerable extent due to their substantially linear structures and to regular or stereospecific arrangements of side-chain groups (in the case of polypropylene) which permits the polymers to exist in crystalline form. In contrast to this, ethylene-propylene copolymer has an irregular or atactic structure and is substantially amorphous in form. The present invention provides polymers which contain both the isotactic homopolymers and atactic copolymer, alternating as "blocks" in the same polymer chains. The presence of copolymer modifies the properties of the homopolymers in certain desirable ways as will be discussed in detail hereinbelow.

The properties of representative homopolymers of ethylene and propylene produced by the low pressure polymerization process are set forth below:

TABLE I

Physical properties of polyethylene and of polypropylene prepared by the low pressure process with Ziegler-type catalysts

| | Linear polyethylene | Isotactic polypropylene |
|---|---|---|
| Density | 0.9494 | 0.9009 |
| Tensile properties: | | |
| Strength: | | |
| Yield (p.s.i.) | 3,772 | 4,920 |
| Break (p.s.i.) | 1,474 | 2,981 |
| Percent elongation: | | |
| Yield | 15 | 14 |
| Break | 154 | 319 |
| Impact strength [1] | 0.38 | 0.68 |
| Melt index (190° C.) [2] | 1.8 | 0.98 |
| Clash-Berg modulus data:[3] | | |
| $T_f$ modulus, 135,000 p.s.i., (° C.) | 17.5 | 42 |
| $T_{2,000}$ modulus, 2,000 p.s.i. ,(° C.) | 124.5 | 158 |
| Stifflex range | 107 | 116 |
| 25° modulus (p.s.i.) | 105,000 | 205,000 |
| Brittleness temperature: (50% failure) | (4) | (5) |

[1] Determined by the Notched Izod Impact Test, values reported are (ft. lb./inch notch).
[2] The weight of material in grams which flows out through a hole 0.0825 inch in diameter and 0.315 inch in length, under a load of 2,160 grams, in 10 minutes (ASTM D 1238–52T).
[3] The Clash-Berg modulus data gives information of the torsional stiffness of the polymer as related to temperature. The $T_f$ value is the temperature at which the polymer just begins to have some slight degree of flexibility; and the $T_{2,000}$ is the temperature at which the material becomes very rubbery and non-load bearing. The Stifflex range ($T_{2,000}$–$T_f$) represents the temperature range over which the polymer is reasonably tough, i.e., high in impact strength, and at the same time rigid enough to bear some load. The value of the 25° modulus is determined to provide a further indication of the torsional modulus at approximately room temperature.
[4] No break at −75° C.
[5] 15 to 20° C.

It can be seen from the above data that the polypropylene sample has a higher tensile strength at room tempearture, and is suitable for use at higher temperatures (as indicated by its higher $T_{2000}$); however, it is apparent that the polypropylene is inferior for use at lower temperatures, as indicated by its $T_f$ well above room temperature, and similarly by its brittleness temperature only very slightly below room temperature. It can readily be appreciated that it would be advantageous to extend the useful temperature range of polypropylene downward to obtain some of the desirable and useful characteristics of the linear polyethylene at low temperatures, while still retaining the useful higher temperature properties of polypropylene. Conversely, the invention can be envisaged as contemplating the extension of the useful polyethylene temperature range to higher temperatures.

It is an object of the present invention to provide a method of controlling the interpolymerization of ethylene and propylene in the presence of low-pressure polymerization catalysts in order to obtain polymer product of desired properties. It is a further object of the invention to prepare polymers having a broader Stifflex range than the average Ziegler polyethylene. It is a further object to prepare a polymer having improved and more useful low temperature properties than isotactic polypropylene.

It is another object of the invention to provide a method of controlling the low-pressure interpolymerization of ethylene and propylene in which the concentration of at least one of the monomers is so regulated that the other monomer is present as the sole monomer available for polymerization at intervals during the reaction. It is a more specific object to regulate monomer concentration and control product properties by intermittently injecting at least one of the monomers at substantially spaced intervals during the polymerization. It is a still further object to have one of the monomers available only for intervals shorter than the average growing polymer chain life of the catalyst employed and preferably much shorter than such chain life, in order to promote polymerization of said scarce monomer as copolymer "blocks" in the homopolymer chain formed from the other monomer, rather than as a part of a new copolymer or homopolymer chain. The pattern of alternating blocks of atactic copolymer with blocks of crystallizable homopolymer can be achieved by feeding the monomer used in predominant proportion at a rate so that the concentration of said monomer in the polymerization zone is substantially above zero. On the other hand, the monomer used in minor proportion intermittently varies to such a low concentration that essentially all polymer being produced is homopolymer blocks consisting of the monomer charged in the major proportion.

It is another object of the present invention to provide ethylene/propylene copolymer comprising polymer chains which are made up of blocks of isotactic polypropylene homopolymer and blocks of atactic ethylene/propylene copolymer. It is yet another object of this present invention to provide ethylene/propylene interpolymers comprising polymer chains made up of blocks of linear polyethylene homopolymer and blocks of ethylene/propylene copolymer. Another object of this invention is to provide an ethylene/propylene copolymer having polymeric chains consisting of homopolymeric blocks and atactic copolymeric blocks wherein the weight ratio of monomers in the overall polymer is at least 3 to 1, thus, the monomer which is used to build the homopolymer blocks in the polymer chains is used in at least 75% by weight, preferably from 75% to 98% by weight, of the total weight of monomer participating in the overall polymeric product. For example, when ethylene or ethylene/proylene copolymer blocks are used to broaden the Stifflex range of isotactic polypropylene, we can use propylene to make up at least 75% of the weight of the polymer and 25% or less weight percent of ethylene. For particularly improved polymeric products we prefer to employ feed rates to obtain material containing 92–98 weight percent propylene and 8 to 2 weight percent ethylene. Products within the narrow composition range are characterized by having a broad Stifflex range in comparison with 100% propylene polymer. Improved block polymeric products have been obtained containing 92–99.5 weight percent propylene and 8 to 0.5 weight percent ethylene.

As a further embodiment of our invention, we can employ the intermittent feeding of propylene to produce the unexpected modification of polyethylene. We can advantageously use feed rates which will yield polymer containing at least 75 weight percent ethylene with the balance being propylene. Of particular interest are the polymers, prepared by our invention, containing 85 to 98 weight percent ethylene and 15 to 2 weight percent propylene, and polymeric products of 0.5 weight percent propylene with the balance being ethylene have been found to be of interest.

Our invention can be practiced within a wide range of feed intervals due to the reactivity ratios of the comonomers under the influence of the particular catalyst system selected. The ultimate composition, and therefore properties of the product, are also affected by pressure and temperature. It will be understood that any change in the system which affects the reactivity ratio of the monomers used, will affect the ultimate product properties.

The operation of our novel process to prepare new block type copolymers can be better understood by reference to a generalized representation as illustrated in the drawing. In the upper part of the drawing, the curve represents a generalized composition of the polymer chain, as a function of time and chain-length, as one monomer is fed continuously to the reactor while employing an intermittent feed of the monomer used in the minor proportion. The feed of the monomers as a function of time is indicated at the lower part of the drawing. The schematic chain composition in the drawing shows a theoretical conception of how the copolymer blocks are tied into the chain of homopolymer as the polymerization proceeds with the intermittent feed of the second monomer.

The drawing is used to illustrate one facet of our invention. A composition curve of the same general characteristic pattern would be obtained by the intermittent feed of both monomers to the polymerization zone. Further modification of the shape of the curve can be obtained by interrupting the continuous flow while simultaneously intermittently charging the second monomer. Naturally the proportion of copolymer blocks in the overall polymer can be further varied by increasing the frequency and/or the time of the intermittent feed. The dotted portion of the curve indicates the shape that can be achieved, if desired, by modification or alteration of one or more of the variables, as herein described.

The intermittent feed can be varied from 3 to about 30 or 60, or to about 120 or more complete cycles per hour. A cycle is understood to be the interval of time measured from the start of the feed of the monomer used intermittently and in minor proportion, including the time during said monomer feed and the time during which the concentration of said monomer within the polymerization zone drops to about zero. The cycle ends and a second cycle begins when the intermittent feed of said monomer is again started. We can shorten the time cycle by the use of increased pressure within the polymerization zone, by the selection of especially active catalysts, or by the use of optimum temperature during the polymerization. For convenience in controlling the intermittent feed we prefer to use a time cycle of about 30 seconds up to about 20 minutes. We ordinarily prefer to operate our system to insure that the polymer chains contain about 2 to 5, and upwards of 10 blocks of alternating copolymer and homopolymer. The number of blocks along the polymer chain is dependent upon the variables that influence the selection of the time of the monomer feed cycle, as well as the number of cycles fed during the life time of an active catalyst site, and the time of the average growing polymer chain life.

Although we do not intend to be bound or limited in the practice of our invention to theoretical considerations, it is believed that the time for one complete cycle is limited by the time during which polymer chain at a particular catalyst site continues to lengthen itself. An active site is understood to be a site which will sustain the continued growth of a polymer chain. Studies have been carried out on the Ziegler type catalysts used for the practice of our invention to determine growing polymer chain life and the time of the existence of an average active site. Radio active counting studies have indicated that growing polymer chains can have a lifetime of about twenty minutes or more. Active sites can exist for much larger periods. To prepare the novel polymers according to our invention, the intermittently fed second monomer must be added to the polymerization reactor during the lifetime of a growing chain, therefore there must be at least one cycle of monomer feed during the life of the growing chain. In general, we can say that we must operate our system to maintain a feed rate of at least three cycles per hour.

The duration of feed for the monomer charged intermittently can be varied from a fraction of a second to 60 seconds, e.g., we can feed this monomer for a fraction of a second every 2 minutes, up to 60 seconds every two minutes in a 30-cycle per hour operation, or this monomer can be fed for a fraction of a second to 600 seconds every 20 minutes. Normally, for convenience in operation, we prefer to feed the other monomer at a constant rate during the polymerization, but we can interrupt this monomer flow during the intermittent addition of the second monomer. We prefer to feed the monomer, added in minor proportion, for about 5 seconds to about 60 seconds during each 2-minute cycle. The ultimate restriction on the feed rate (duration and number of cycles) is that the weight ratio of monomers in the product polymer be at least 3 to 1.

Although we have illustrated the practice of our invention by the use of regular monomer feed cycles, the use of regular cycles was selected herein for uniformity in comparing polymer properties. It will be understood that by the use of automatic feed valves a schedule of varying monomer feed duration and varying cycle lengths can be programed to the monomer feed system. Within the scope of our invention are thus included the programed feed schedules; the present invention can be practiced by any procedure or mechanical technique which permits the intermittent addition of the monomer used in a minor proportion to obtain a varying proportion of this monomer in the polymerization zone.

The preparation of the block copolymers of our invention can be conducted in the presence of a polymerization catalyst selected from the material called Ziegler catalysts, materials advanced by Prof. Dr. Karl Ziegler of the Max Planck Institute at Mulheim, Ruhr, Germany. Probably, the preferred group of these catalysts is that disclosed in Belgian Pat. No. 533,362 issued May 16, 1955 to Ziegler, namely catalysts prepared by the interaction of a trialkylaluminum with a compound of a metal of Group IV-B, V-B, or VI-B of the Periodic System, including thorium and uranium. These and the variety of other catalyst of the Ziegler type, can be considered exemplified by the catalysts obtained by the interaction of a trialkylaluminum with titanium tetrachloride. Other catalysts of the Ziegler type differ from those disclosed in the above-mentioned Belgian Pat. No. 533,362, in various ways, for example, as follows. Instead of or in addition to the aluminum trialkyls, catalysts of the type described in the Belgian patent can be made by reacting the various metal compounds of Groups IV-B, V-B, and VI-B disclosed therein with aluminum compounds of the general formula $RAlX_2$ or $RAlXY$, where R is hydrogen or hydrocarbon, X and Y can be any other substituent including hydrogen or hydrocarbon, particularly dialkyl or diaryl aluminum monohalides, also aluminum hydride, alkyl or aryl aluminum dihydrides, dialkyl or diaryl aluminum hydrides, alkyl or aryl aluminum dihalides, alkyl or aryl aluminum dialkoxy or diaryloxy compounds, dialkyl or diaryl aluminum alkoxy or aryloxy compounds. Similarly, instead of or in addition to the organoaluminum compounds, organic compounds of magnesium or zinc can be used, and these can contain either a single or two hydrocarbon radicals, those of especial interest being Grignard compounds, magnesium dialkyls, mixed organo zinc compounds such as $C_2H_5ZnI$ and zinc dialkyls, all of these, of course, being reacted with compounds of Group IV-B, V-B or VI-B metals. Another Ziegler-type catalyst is prepared by the interaction of an aluminum compound of the general formula $R_2AlX$, where R is a hydrocarbon radical such as alkyl or aryl, and X is a halogen, with a compound of a metal of Group VIII of the Periodic System, e.g., iron, nickel, cobalt, or platinum, or manganese, for example, dimethylaluminum monobromide plus ferric chloride, diisobutylaluminum chloride plus nickel (trivalent) chloride, diethylaluminum monochloride plus manganic chloride. Yet another combination is that of the Group IV-B, V-B, or VI-B metal compounds with aluminum compounds of the general formula $R_2AlX$, where R is hydrogen or a hydrocarbon radical, and X is the radical of a secondary amine, a secondary acid amide, a mercaptan, a thiophenol, a carboxylic acid, or a sulfonic acid, e.g., piperidyl diethylaluminum plus $TiCl_4$, dimethylaminodiethylaluminum plus zirconium tetrachloride, ethylmercaptodiethylaluminum plus $TiCl_4$. Another of the classes of Ziegler-type polymerization catalysts comprises compounds of the Groups IV-B, V-B, and VI-B heavy metals as previously mentioned, combined with the alkali metal alkyls, for example, with lithium-, sodium-, or potassium methyl, -ethyl, -benzyl, -isobutyl, or with complex compounds of such alkali metal alkyls with organic compounds of aluminum, magnesium, or zinc as mentioned above, or complex compounds of alkali metal hydrides with such organic compounds of aluminum, magnesium, or zinc, for example, butyl lithium plus zirconium tetrachloride, sodium tetramethylaluminum plus titanium tetrachloride or plus thorium acetylacetonate. Other Ziegler-type catalysts are prepared by using (in conjunction with compounds of Groups IV-B, V-B, and VI-B metals), instead of trialkyaluminums, triaryl-, triaralkyl-, trialkaryl-, or mixed alkyl- and aryl- aluminum, zinc, magnesium, or alkali metals, e.g., phenyl sodium plus $TiCl_4$.

Those skilled in the art having knowledge of these matters, refer to catalysts of the foregoing type as Ziegler or Ziegler-type catalysts; or as Ziegler catalysts adapted for low-pressure polymerization of ethylene or ethylenically unsaturated monomers; and to polymer prepared by their action as Ziegler or Ziegler-type polymers, the terms "Ziegler" and "Ziegler-type" being used synonymously. While the principal classes of such catalysts have been listed, this listing is not to be construed as complete, and various other such catalysts than those set forth may also be used to produce polymers. Thus, ethylene and other monomers can be polymerized by catalysts obtained by treating compounds of heavy metals, especially compounds of the Groups IV-B, V-B and VI-B metals, not with organometallic compounds but rather by reducing agents such as: alkali metals, e.g., lithium, sodium, potassium; alkali hydrides, e.g., lithium hydride, sodium hydride; complex alkali aluminum and alkali boron hydrides, e.g., lithium aluminum hydride; complexes of alkali metal hydrides with boron triaryls or boric acid esters of boronic acid esters; and especially titanium and zirconium halides reduced by zinc or alkaline earth metals or other earth metals including the rare earths, or hydrides of same; said reductions being effected in the complete absence of oxygen, moisture and compounds containing active hydrogen atoms as determined by the Zerewitinoff method. Attention is further directed to the teaching of various of the foregoing catalysts in Ziegler's Belgian Pats. 534,792 and 534,888. Still another disclosure incorporated herein by reference is that of Belgian Pat. 538,782, issued jointly to Montecatini Societa Generale per L'Industria Mineraris E Chimica Anonima and Prof. Dr. Karl Ziegler, disclosing the polymerization of olefins having at least 3 carbon atoms in the molecule, and their copolymerization with each other and with ethylene, using a variety of Ziegler catalysts; olefins, especially α-olefins, disclosed in said Belgian Pat. 538,728 include propylene, butylene, isobutylene, pentylene, hexylene, vinyl cyclohexane, and styrene. Substantially the same disclosure is found in Australian patent application 9651/55 also filed by Montecatini and Ziegler jointly. Catalysts of the said Belgian Pat. 538,782 and Australian application 9551/55 are obtained by reaction of compounds of metals of the left-hand column of the 4th to 6th groups of the Periodic Table of elements, including thorium and uranium, with metals, alloys, metal hydrides, or metal-organic compounds of metals at the 1st to 3rd groups of the Periodic Table. Yet another disclosure incorporated herein by reference is that of Ziegler's Australian patent application 13,453/55, opened to public inspection May 10, 1956, directed to polymerizing ethylene with catalysts comprising mixtures of organic compounds of the metals of Groups I to III of the Periodic System of the general formula $R_nMeX$, wherein R represents a hydrocarbon radical; X, a hydrocarbon radical or halogen; and Me, a metal of Groups I to III of the Periodic System; and $n$, an integer which is less by one than the valency of the metal Me, with compounds of the metals of Group VIII of the Periodic System or manganese.

A portion of the Ziegler catalysts can be defined as catalysts comprising mixtures of metals or metal compounds of the 1st to 3rd groups of the periodic chart of the elements with compounds of metals of the 4th to 6th groups (including thorium and uranium) of the said periodic chart.

Another group of valuable Ziegler catalysts can be defined as mixtures of organic compounds of metals selected from the group consisting of $R_nMeX$ in which R is hydrocarbon; Me is a 1st to 3rd group metal; X is hydrogen, hydrocarbon or halogen; and $n$ is a number which is lower by one than the valence of the metal Me, with a salt of a Group IV–B to VI–B metal. The molar proportion of the organic metal compound is ordinarily sufficient to reduce the valence of the Group IV–B to VI–B metal at least in part.

Ziegler catalysts can also be defined as including all polyvalent metal compounds in combination with reducing agents, particularly organometals, which are effective to reduce the valence of the polyvalent metal; or as compositions containing polyvalent metals in a valence state lower than their maximum state and adapted for the low-pressure polymerization of ethylene, and ethylenically unsaturated olefins, so that when suspended in a concentration of about 20 mmoles/liter (based on polyvalent metal) in a well-agitated inert solvent, it will cause an ethylene uptake rate of at least 5 grams per hour per liter of solvent.

It will be seen from the foregoing that a large variety of coreactants can be employed which by interaction with each other result in the formation of a Ziegler catalyst. It is generally considered that the Ziegler catalysts are obtained by interaction of a polyvalent metal compound with another metal in elemental or combined form resulting in reduction of the valence state of the first said metal. The resulting polymetal Ziegler catalyst is believed to act as a heterogeneous catalyst, i.e., at least some of the product obtained by the interaction of the materials in question is present in solid form, although often in such finely-divided form as to be of colloidal or sub-colloidal particle size. The Ziegler catalyst can be employed in the absence of any extraneous liquid suspending agent, such as a liquid inert hydrocarbon, e.g., kerosene, but is more often employed in the form of a colloidal solution or suspension in such a liquid.

The essence of the present invention, however, is not to be found in the particular catalyst employed but rather in the use of an intermittent feed of a second monomer to a polymerization reaction to prepare new block polymers having blocks of homopolymer of either linear polyethylene or of isotactic propylene and blocks of ethylene/propylene atactic polymer occurring along the polymer chain.

To produce our new polymeric products we have preferred the Ziegler polymerization catalysts, but other stereospecific catalysts can be used. Polymers of the type with which the present invention is concerned can also be made by the catalysts described by the Phillips Petroleum Company in Belgian Pats. 530,617 and 535,082.

A number of catalysts have been described by the Standard Oil Company of Indiana, which can be used to produce these block polymers, for example the so-called hydroforming catalysts, which are mainly supported oxides of metals of Group VI of the Periodic System, especially the group of chromium, molybdenum and tungsten usually pre-reduced with reducing gases at elevated temperatures or activated by treatment with metal alkyls, lithium aluminum hydride and the like. In general the low temperature polymerization process uses the so-called stereospecific catalysts, and any of these catalysts that normally polymerize ethylene to linear polyethylene and propylene to isotactic polypropylene can be used in our novel process.

In the practice of our invention, it is sometimes desirable to control the molecular weight of the polymeric product by the addition of a catalyst modifier, e.g., we can use a reactive organic oxygen compound as described in copending application Ser. No. 695,153, a thiophenol as described in copending application Ser. No. 609,798, or water as described in copending application Ser. No. 736,976.

Ziegler catalysts can be prepared in the vessel in which the catalyzed reaction is to be carried out, or can be prepared in one vessel and then transferred to the intended reaction vessel, and in either event, can either be used immediately after preparation or after a period of time elapses between the preparation of the catalyst and its subsequent use to catalyze polymerization. If the catalyst is to be used after such a period of time, it is apt to lose activity during the storage period and/or produce polymer of an increased molecular weight as compared with that produced with fresh catalyst and these disadvantages can be minimized by storing Ziegler catalysts at temperatures below about 10° C. and preferably below −25° C. for fairly long storage periods, as disclosed and claimed in copending application Ser. No. 586,352, filed May 22, 1956. While Ziegler catalysts are often conveniently prepared at room temperature, they can be prepared at higher temperatures, and also certain advantages are obtained, including uniform catalyst activity over the course of a reaction period and more effective removal of catalyst residue if the catalyst is prepared at temperatures below about −25° C. as disclosed and claimed in the copending application Ser. No. 586,352, filed May 22, 1956.

We prefer catalysts prepared by the interaction of (a) an aluminum compound of the general formula RAlXY, wherein R is an alkyl, cycloalkyl or aryl radical, X and Y are selected from the group consisting of hydrogen, halogen, or an alkyl, cycloalkyl, or aryl radical, and X and Y can thus be the same or different, with (b) a halide of titanium, vanadium, chromium or zirconium. The preparation of polymers will be described, by way of example, with particular reference to catalysts prepared by the interaction of trialkylaluminum, e.g., triethylaluminum, triisobutylaluminum, trioctylaluminum, with titanium tetrachloride, titanium trichloride, vanadium trichloride, chromium chloride, zirconium trichloride, or zirconium tetrachloride.

Suitable aluminum compounds to be reacted with a titanium, vanadium, chromium, or zirconium halide are those represented by the general formula RAlXY, wherein R is an alkyl, cycloalkyl, or aryl radical, X and Y can be hydrogen, halogen, or alkyl, cycloalkyl or aryl radicals. By way of example; but not limitation, the following compounds are mentioned:

triethylaluminum
triisobutylaluminum
trioctylaluminum
didodecyloctylaluminum
diisobutylaluminum hydride
tridodecylaluminum
diphenylaluminum bromide
dipropylcyclohexylaluminum
ditolylmethylaluminum
tri-($\beta$-phenylethyl)aluminum
diethylaluminum chloride
diisobutylaluminum chloride
diisobutylaluminum iodide
di-($\beta$-cyclohexylpropyl)isobutylaluminum It is to be understood that mixtures of the foregoing types of aluminum compounds can be employed. One can use the total reaction mixtures obtained in the formation of such compounds, e.g., by treatment of metallic aluminum with alkyl halides resulting in the formation of such mixtures as $R_2AlCl$ plus $RAlCl_2$, termed alkylaluminum sesquihalides.

The aluminum compounds in question are interacted with one or more halides of titanium, of chromium, of vanadium, or of zirconium. The titanium, chromium, vanadium, or zirconium in these halides should be in a valence form higher than the lowest possible valence. The tetrahalides, dihalides, trihalides, mixtures of di-, tri-, and tetrahalides, etc., can be used. Preferred titanium, chromium, vanadium, or zirconium compounds are those that are soluble in an organic solvent (preferably a hydrocarbon such as hexane, benzene, kerosene, etc.) that is used in preparing the catalyst. Titanium, chromium, vanadium or zirconium compounds other than the halides, e.g., those called alcoholates, alkoxides or esters by various investigators such as titanium tetramethoxide (also called tetramethyl titanate), titanium triethoxide, vanadium tributoxide, tripropoxytitanium chloride, zirconium tetra-n-butoxide, or complexes such as zirconium acetylacetonate, $K_2TiF_6$, or salts of organic acids such as the acetates, benzoates, etc., can be used to prepare catalysts with at least some activity and to that extent can be considered equivalents of the halides; however, such compounds are usually prepared from the halides and hence are more costly, and also are usually less active, so their use is economically sound only where in a particular situation favorable effects can be obtained such as increased solubility in an organic solvent that is used in preparing the catalyst, or polymer of increased molecular weight, of faster reaction rate. Although the exact action resulting from contacting the aluminum compound with the titanium, chromium, vanadium, or zirconium compound is not understood, it is believed likely that the metal ion of the latter compound is reduced in valence by the reaction of the added aluminum compound. The mole ratio of aluminum compound to titanium compound or stated another and simpler way, the mole ratio of aluminum to titanium can vary over a wide range of suitable values being from 0.1:1 to 10:1 on up to 15:1 or higher. It is generally preferred to use an Al:Ti mole ratio between 0.3:1 and 5:1. The same ratios apply in the case of the zirconium, chromium or the vanadium compounds.

While active catalyst can be prepared by a variety of procedures, the simplest and perhaps most effective is to add the titanium, chromium, vanadium or zirconium halide to the aluminum compound, or vice versa, preferably in the presence of an inert organic solvent. Such solvents can suitably be saturated aliphatic and alicyclic and aromatic hydrocarbons, halogenated hydrocarbons and saturated ethers. The hydrocarbon solvents are generally preferred. By way of example can be mentioned liquefied ethane, propane, isobutane, normal butane, n-hexane, the various isomeric hexanes, isooctane, cyclohexane, methylcyclopentane, dimethylcyclohexane, dodecane, industrial solvents composed of saturated and/or aromatic hydrocarbons, such as kerosenes, naphthas, etc., especially when hydrogenated to remove any olefin compounds and other impurities, and especially those ranging in boiling point up to 600° F. Also, benzene, toluene, ethylbenzene, cumene, decalin, ethylene dichloride, chlorobenzene, diethyl ether, o-dichlorobenzene, dibutyl ether, tetrahydrofuran, dioxane. In some instances, it is also advantageous to prepare the catalyst in the presence of monomer.

It may also be mentioned here that the polymerization can readily be effected in the presence of any of the classes of solvents and specific solvents just named. If the proportion of such solvents is kept low in the reaction mixture, such as from 0 to 0.5 part by weight inert organic solvent (i.e., inert to the reactants and catalysts under the conditions employed) per 1 part by weight total polymer produced, solvent recovery steps are obviated or minimized with consequent advantage. It is often helpful in obtaining efficient contact between monomers and catalyst and in aiding removal of heat of reaction, to employ larger amounts of solvent, for example, from 5 to 30 parts by weight solvent per 1 part by weight total polymer produced. These inert solvents, which are solvents for the monomers, some of the catalyst components, and some of the polymers but are non-solvents for many of the polymers, can also properly be termed inert liquid diluents, or inert organic liquids.

The amount of catalyst required is dependent on the other variables of the polymerization reaction and although amounts as small as 0.01 weight percent based on total weight of monomers charged are sometimes permissible, it is usually desirable to use somewhat larger amounts, such as from 0.1 up to 2 to 5 percent or even considerably higher, say up to 20 percent, depending upon the monomer proportions, the presence or absence of solvent, the temperatures, pressures, and other reaction conditions. When polymerization is effected in the presence of a solvent, the catalyst to solvent weight ratio should be at least about 0.001:1 and much lower values such as 0.0001:1 can sometimes be used.

The polymerization can be effected over a wide range of temperatures, again the particular preferred temperatures being chosen in accordance with the pressure, particular catalyst and other reaction variables. Temperatures down to say −40° C. and even lower are suitable, and in many cases it is preferred that the temperature be maintained at below about 35° C. However, higher temperatures appear to be optimum, say from 50° to 90° C. Temperatures ranging up to 150° C. and higher are generally satisfactory for Ziegler-type polymerization.

In most instances, the polymerization is suitably carried out at atmospheric pressure or higher. Sub-atmospheric pressures are permissible. Pressures ranging from atmospheric up to several hundred or even many thousand pounds per square inch, e.g., 50,000 and higher, are suitable. While high pressures are not required in order to obtain the reaction, they will have a desirable effect on reaction rate, and in some instances, on polymer quality. The choice of whether or not to use an appreciably elevated pressure will be one of economic and practical considerations taking into account the advantages that can be obtained thereby.

The polymer will be recovered from the total reaction mixture by a wide variety of procedures, chosen in accordance with the properties of the particular polymer, the presence or absence of solvent, and the like. It is generally quite desirable to remove as much catalyst from the polymer as possible, and this is conveniently done by contacting the total reaction mixture or the polymer after separation from solvent, etc., with methanolic hydrochloric acid, with an aliphatic alcohol, such as methanol, isobutanol, secondary butanol, or by various other procedures. If the polymer is insoluble in the solvent, it can be separated therefrom by filtration, centrifuging or other suitable physical separation procedure. If the polymer is soluble in the solvent, it is advantageously precipitated by admixture of the solution with a non-solvent, such non-solvent usually being an organic liquid miscible with the solvent but in which the polymer to be recovered is not readily soluble. Of course, any solvent present can also be separated from polymer by evaporation of the solvent, care being taken to avoid subjecting the polymer to too high a temperature in such operation. If a high boiling solvent is used, it is usually desirable to finish any washing of the polymer with a low boiling material, such as one of the lower aliphatic alcohols or hexane, pentane, etc., which aids removal of the higher boiling materials and permits the maximum removal of extraneous material during the final polymer drying step. Such drying step is desirably effected in a vacuum at moderate temperatures, preferably well below 100° C.

The following equation is useful in calculating feed ratios, cyclic lengths, injection intervals and percent of a given monomer in the feed gas.

$$\text{Fraction of Monomer A in Feed} = \frac{F_A \cdot t_A}{F_B \cdot t_B + F_A \cdot t_B}$$

Where $F_A$=monomer A feed rate in grams/sec. (or moles/sec.)
$F_B$=monomer B feed rate in grams/sec. (or moles/sec.)
$t_A$=length of injection interval for monomer A
$t_B$=length of injection interval for monomer B (or length of cycles if monomer B is fed continuously)

By our novel process block copolymers can be prepared with alternating blocks of linear, isotactic polypropylene (or linear, highly crystalline polyethylene) and linear atactic ethylene-propylene copolymer. The block copolymer of linear isotactic polypropylene with atactic ethylene-propylene copolymer is characterized by a broadened Stifflex range and improved low temperature characteristics (as compared to normal polypropylene) with retention of a considerable measure of the desirable high temperature characteristics of isotactic polypropylene. The block copolymers of linear, highly crystalline polyethylene with atactic ethylene-propylene copolymer are characterized by a broadened Stifflex range and improved impact properties.

By adjustment of the reaction variables it is possible to vary the block character of the composition that is obtained. In general, the block character will depend on the rapidity with which an intermittently injected monomer is utilized in polymer formation, e.g.

$$\text{percent block character} = \left(1 - \frac{T_u}{T_c}\right) 100$$

where $T_c$=time of one complete cycle
$T_u$=time of substantial exhaustion of intermittently fed monomer
and $T_u < T_c$ The $T_u$ value is dependent on the rate of feed of the intermittently fed monomer(s) and the rate of its (their) polymerization, and the rate of polymerization is of course, dependent on the reactivity ratio and the effective monomer concentration. The reactivity ratios are in turn influenced by the catalyst composition. The effective monomer concentrations are, of course, dependent on diffusion rate of gas to liquid, pressure, temperature, and suspending media used.

In order to illustrate some of the various aspects and advantages of the invention, illustrative examples are given herein. It will, of course, be understood that variations from the particular components, reactants, solvents, proportions, temperatures and the like can be made without departing from the invention.

EXAMPLE 1

A two and one-half liter stainless steel reactor was used for all of the examples described herein. The stirrer for this reactor consisted of two turbines driven by an electric motor at 2000 r.p.m. The monomer inlet valves were electrically controlled and adjustable to permit intermittent feeding at a preselected timed interval.

To the reactor was charged 32.47 millimoles (mmoles) dry $TiCl_3$. A solution of 97.38 mmoles $Al(C_2H_5)_3$ in 200 ml. isooctane was then added. The catalyst was aged at 25° C. for one hour with stirring at a rate of 500 r.p.m. Additional isooctane, 882 ml., was then added and the total catalyst heated to 70° C. The mole ratio of aluminum to titanium in this catalyst was 3.0. The automatic feed valves were preset to feed ethylene monomer for 108 seconds in every 2-minute cycle. This valve was then automatically closed during a 12-second interval while propylene monomer was being fed. This alternating feed using a 2-minute cycle was used for the duration of the 2-hour run. Temperature was maintained at 70° throughout the polymerization. The monomer flows were regulated by flow meters to give a total feed rate of ~100 of monomers per hours. Actual weights of monomers charged were checked at the end of the run by measuring the weight losses from the ethylene and propylene feed cylinders. In this example a total of 150 g. of ethylene was fed and 47.0 g. of propylene was fed alternately.

The polymer was quenched with methanol, filtered and washed with methanol. The product was further purified in refluxing isobutanol which was filtered off and another methanol wash employed. After drying this polymer was evaluated for physical properties.

Evaluation data for the polymer prepared in this and succeeding examples have been summarized herein at the end of the illustrative section in tabulated form. Comparison of individual runs is thus facilitated by reference to these tables of polymer properties.

EXAMPLE 2

In this example the catalyst charged was exactly as used in Example 1. The automatic valves were preset to feed propylene for 108 seconds in each 2-minute cycle and alternately ethylene for 12 seconds in a 2-minute cycle. After the 2 hour polymerization period the weights of monomer charged were determined to be 154 g. propylene and 35 g. (18.5% by weight of total charge) of ethylene. The polymer was worked up with methanol and isobutanol as previously described.

EXAMPLE 3

The object of this run was to obtain polymer prepared by the conventional uniform feed technique, and thus to make a direct comparison with this material's properties and the product prepared by our invention. The proportions of ethylene and propylene used in the preparation of the block copolymer of Example 2 were premixed herein and charged to the polymerization reaction vessel as a single uniform feed.

A cylinder for use as a feed tank was charged with 18.5% ethylene and 81.5% propylene by weight and agitated well to insure a uniform mixture. This mixture was fed to the reactor containing a $TiCl_3$—$Al(C_2H_5)_3$ catalyst exactly as used in Example 1 while maintaining the polymerization temperature at 70°. The weight of the gas mixture charged in 153 minutes was 185 g. Product polymer was worked up using the methanol-isobutanol procedure as described in Example 1.

Comparison of Examples 2 and 3 indicates the polymer prepared by alternating intermittent feeds of ethylene and propylene is considerably different from the uniform polymer. The Stifflex range is broader and the polymer of this invention has more stiffness and tensile strength not characteristic of a uniform copolymer of corresponding weight composition.

EXAMPLE 4

With the catalyst charge of 32.28 mmoles $TiCl_3$, 96.84 mmoles $Al(C_2H_5)_3$ in 1076 ml. of isooctane, the automatic feed valve was adjusted to feed ethylene intermittently for one second every 2 minutes and propylene continuously so as to provide about 8% by weight ethylene in the polymeric product, using a 2-minute feed cycle. After a 195 minute polymerization period at 70° C. 242 g. of propylene and 20 g. (7.6% by weight of the total polymer) of ethylene had been added alternatively. After a methanol and isobutanol purification the product was dried and its physical properties determined.

EXAMPLE 5

A feed cylinder was charged with 1258.5 g. of propylene and 113.5 g. of ethylene and rocked overnight to insure uniformity. The reactor was charged with 32.97 mmoles $TiCl_3$ and 98.91 mmoles of $Al(C_2H_5)_3$ dissolved in 200 ml. of isooctane. This catalyst was aged at 25° for one hour with moderate stirring and then 899 ml. isooctane was added and the mixture heated to 70°. The uniform mixture of monomers containing 8.2% by weight of ethylene was fed to the reactor for 3 hours and 50 minutes at 70° C. A total of 262 g. of the monomer mixture was charged to the polymerization reactor. After quenching catalyst with methanol and washing with methanol, the polymer was refluxed in isobutanol, filtered, washed again with methanol and dried in a vacuum oven.

Comparison of Examples 4 and 5 shows clearly the differences between the products of this invention and ordinary copolymers prepared by uniform feeds. In particular, note the partial retention of the good low temperature properties of the uniform copolymer and the broadened Stifflex range, superior stiffness modulus and better tensile properties of the product of this invention (see the Tables of Evaluation Data herein below).

EXAMPLE 6

The catalyst for this reaction was prepared by adding 1.879 g. of $3TiCl_3 \cdot AlCl_3$ and 3.85 ml. $Al(C_2H_5)_3$ in 200 ml. special normal hexane to the reactor and aging for 1 hour at 25° C. The remaining hexane, 946 ml. was added and the catalyst mixture heated to 50° C. Ethylene was fed for 10 seconds every two minutes and propylene fed continuously for 143 minutes. A total weight of 190 g. of propylene and 10 g. of ethylene was fed during that period. The polymeric product was quenched slowly with isobutanol, filtered at 20° C. and washed with methanol. After drying in a vacuum oven the polymer was evaluated to determine its physical properties.

EXAMPLE 7

The catalyst for this reaction was prepared as in Example 6. A mixture of 95 weight percent propylene-5 weight percent ethylene was fed for a period of 150 minutes. After working up as in Example 6 the product was evaluated to determine its physical properties. The polymer obtained in this example had poor properties, compared with the product from Example 6. The data are summarized in the tables below.

EXAMPLE 8

The reactor was charged with 28 mmoles of $TiCl_4$ and 28 mmoles of $Al(iso-C_4H_9)_3$ in 1-liter isooctane and 28 mmoles of phenol was added as a catalyst modifier. The monomer feed valves were preset to automatically feed, in a 2-minute cycle, ethylene for 108 seconds and alternately propylene for 12 seconds. This alternating feed was continued for 2 hours at a polymerization temperature of 50°. The weight of monomer charged was determined to be 163 g. ethylene (80.7% by weight) and 39 g. of propylene. The catalyst was quenched in isobutanol, filtered, and refluxed in isobutanol and than washed with methanol and dried before being evaluated.

EXAMPLE 9

Mechanical mixtures, polyblends, were prepared and evaluated as a further guide in comparing the evaluation data for the novel polymers of our invention. To obtain uniform polyblends, weighed proportions of highly crystalline polypropylene pellets and high molecular weight linear polyethylene pellets were mixed and then extruded at an extruder temperature of 200–210° C. The extruded polyblend was pelletized and passed through the extruder a second time at 200–210° C. to insure a completely uniform material.

Polyblends were prepared having the following compositions:

Ex. 9A:                                                     Percent
    Polyethylene —————————————————— 80
    Polypropylene ————————————————— 20

Ex. 9B:                                                   Percent
    Polyethylene —————————————————— 10
    Polypropylene ————————————————— 90

Evaluation of these products for physical characteristics is reported hereinbelow.

EXAMPLE 10

The reactor was charged with 4.75 mmoles $VCl_3$ and 14.25 mmoles $Al(C_2H_5)_3$ dissolved in 200 ml. n-hexane. This catalyst was aged for one hour at 25° C. with moderate agitation, 750 ml. n-hexane added and the catalyst heated to 50°. The automatic monomer feed valves were preset to feed propylene continuously and to feed ethylene for a 10-second interval in every 2-minute cycle. After the polymerization had preceded for 2 hours and 35 minutes a total of 190 g. of propylene had been charged and 10 g. of ethylene. After a methanol quench the polymer was further purified in refluxing isobutanol, washed with hexane and dried in a vacuum oven.

EXAMPLE 11

This run was made using identical catalyst and conditions as used in Example 10 except that a cylinder was charged with 95 weight percent of propylene and 5 weight percent of ethylene. After 2 hours and 27 minutes 200 g. of this uniform monomer mixture was fed to the polymerization reactor. After the methanol quench the polymer was successively treated with refluxing isobutanol, hexane, and methanol and then dried in the vacuum oven.

Examples 10 and 11 illustrate the differences between the products of this invention and ordinary copolymer of the same composition, when prepared with a catalyst which yields a less isotatic type of polypropylene block. The differences in Stifflex range, tensile properties and density are similar to those observed when $TiCl_3$ was used as a catalyst.

EXAMPLE 12

Product from Examples 10 and 11 was submitted to an anhydrous ethyl ether extraction, using a Soxlet extraction apparatus and finely ground polymer, for 48 hours. The product from Example 10 contained 6.3% ether soluble polymer while the polymer from Example 11, prepared using a uniform feed of monomers contained 26.3% ether solubles.

It is well known to those skilled in the art that ether extraction removes non-crystalline, atactic polymer while the crystalline material remains insoluble. It is theorized that the product of our invention contains blocks of crystalline homopolymer joined to blocks of atactic copolymer and that this block polymer is insoluble in ether due to the influence of the crystalline homopolymer blocks. Thus, from the extraction test we find that the copolymer prepared by our novel technique is substantially less ether soluble and exhibits this property which is commonly associated with homopolymer of high crystallinity. On the other hand, copolymer prepared by using a uniform feed of a monomer mixture gives a high ether-soluble fraction, characteristic of a polymer of atactic, or unordered, molecular arrangement. The clear distinction between the polymer prepared by our process using an alternating feed and the copolymer prepared by the use of a uniform feed is readily apparent from the results obtained by this ether extraction. Further differences between product prepared by our invention and the conventional copolymer will be apparent when the physical properties of the materials are studied as are herein below tabulated.

EXAMPLE 13

The catalyst for this reaction was prepared by adding to the reaction 4.78 g. dry $TiCl_3$, 31.02 mmoles, followed by a solution of 12.63 ml. of $Al(C_2H_5)_3$, 93.06 mmoles, in 200 ml. isooctane and ageing for one hour at 25° C. with mild agitation. An addition of 834 ml. isooctane was then made and the catalyst mixture heated to 70° C. The automatic monomer feed valve was preset to intermittently feed alternating streams of ethylene and propylene using a 110 second propylene feed duration with a 10-second duration for the ethylene feed. Polymerization conditions were maintained for 2 hours and 15 minutes at 70° C. A total weight of 10 g. of ethylene and 180 g. of propylene was charged. The polymer product was quenched with methanol and further purified in refluxing isobutanol followed by additional methanol washes. After drying in a vacuum oven the polymer was evaluated to determine its physical properties.

This run and the following two examples were made to determine the reproducibility of the product properties. All products had a wider Stifflex range than the uniform copolymer (Example 11) and considerably better physical properties.

EXAMPLE 14

The $TiCl_3$-$Al(C_2H_5)_3$ catalyst was weighed out to duplicate the charge used in Example 13. In this run the feed valves were preset to alternately feed ethylene and propylene during a 2 minute cycle, with the duration of the ethylene feed predetermined to be 10 seconds in each cycle. The monomers were fed alternately at a reaction temperature of 70° C. for 3 hours and 15 minutes. A total weight of 180 g. of propylene and 10 g. of ethylene was fed to the reactor. The polymer product was purified by successive treatment with methanol, isobutanol, and methanol as previously described.

EXAMPLE 15

Conditions of catalyst charge and temperature were selected to duplicate those used in Examples 13 and 14. In this run ethylene and propylene were fed in a 3 minute cycle with an ethylene feed of 10-seconds duration alternating with a 110-second propylene feed. Polymerization was continued for 3 hours at 70° C., to feed 10 g. ethylene and 180 g. propylene. The polymeric product was processed by successive treatments of methanol, refluxing isobutanol, and methanol. The dried product was then evaluated for physical characteristics.

EXAMPLE 16

The catalyst was prepared by adding 7.05 g. $TiCl_3$, 45.9 mmoles and a solution of 18.69 ml. $Al(C_2H_5)_3$, 137.7 mmoles, in 300 ml. isooctane to the reactor and ageing for one hour at 25° C. An addition of 1224 ml. isooctane was then made to the reactor and the catalyst heated to 70° C. The monomer feed valves were preset to feed propylene continuously and to feed ethylene for an alternating 2 minute cycle (a duration of 2 minutes in every 4 minute cycle). Polymerization was continued for 1 hour and 45 minutes during which time a total of 195 g. of propylene and 40 g. of ethylene was charged. Product polymer was quenched in methanol, further purified in refluxing methanol and repeatedly washed with fresh methanol, dried and evaluated for physical properties.

The evaluation data for the novel polymers of our invention are tabulated hereinbelow.

EXAMPLE 17

A catalyst was prepared containing 9.46 mmoles $TiCl_4$ per liter kerosene and having an $Al(iso-C_4H_9)_3/TiCl_4$ ratio of .518. After ageing ten minutes, 25 g. ethylene was introduced at 40 p.s.i. over a 6 minute period. Ten grams of propylene at 70 p.s.i.g. was then added in a 1-minute interval followed by 65 g. ethylene at 100 p.s.i.; total elapsed time was 28 minutes. This product was isolated and purified in refluxing methanol followed by isobutanol as previously described. After drying, this product was evaluated for its physical properties. The data is reported in the table following.

EXAMPLE 18

A uniform mixture containing 90% ethylene and 10% pyropylene was fed to the reactor containing a catalyst prepared with the identical components and procedure of Example 17. The product polymer was isolated according to the procedure previously described. When this product was evaluated it was found to have a Stifflex range of 120.5° C., while the product from Example 17 had a Stifflex range of 131.5° C. This example illustrates that superior low temperature properties and a broad Stifflex range can be advantageously obtained in a block polymer of ethylene/propylene by using the intermittent alternating feed step of our invention.

|  | Ex. 1 | Ex. 8 | Ex. 9A | Ex. 3 | Ex. 2 | Ex. 5 |
|---|---|---|---|---|---|---|
| Product composition | 76.1% C₂ / 23.9% C₃ / Alt. feed | 80.7% C₂ / 19.3% C₃ / Alt. feed | 80% poly C₂ / 20% poly C₃ / Mech. blend | 18.5% C₂ / 81.5% C₃ / Uniform feed | 18.5% C₂ / 81.5% C₃ / Alt. feed | 8.2% C₂ / 91.8% C₃ / Uniform feed |
| Density | 0.9125 | 0.8976 | 0.9154 | 0.8869 | 0.8987 | 0.8876 |
| Tensile properties: |  |  |  |  |  |  |
| Strength, yield (p.s.i.) | 627 | 659 | 1,882 | -------- | 1,076 | -------- |
| Strength, break (p.s.i.) | 1,561 | 414 | 1,769 | 575 | 1,772 | 1,620 |
| Percent elongation, yield | 30 | 12 | 18 | -------- | 43 | -------- |
| Percent elongation, break | 788 | 160 | 45 | 1,193 | 416 | 905 |
| Impact strength (ft.lbs./in.) | (¹) | 5.2 | 0.91 | (¹) | (¹) | (¹) |
| Melt index | 0.06 | 18.0 | -------- | 0.20 | 0.25 | 0.22 |
| Clash, Berg modulus data: |  |  |  |  |  |  |
| T_f modulus, 135,000 p.s.i., (° C.) | −57 | −48 | −15.5 | −53.5 | −30 | −35.5 |
| T_2000 modulus, 2,000 p.s.i., (° C) | 72 | 79.5 | 102.0 | 10.0 | 74 | 56 |
| Stifflex range | 129 | 127.5 | 117.5 | 63.5 | 104 | 91.5 |
| 25° modulus (p.s.i.) | 11,300 | 14,500 | 42,000 | 1,650 | 14,800 | 7,700 |
| Brittleness temperature, ° C. (50% failure) | (²) | -------- | (³) | (²) | −50-55 | −45-50 |

|  | Ex. 4 | Ex. 9B | Ex. 7 | Ex. 6 | Ex. 10 | Ex. 11 |
|---|---|---|---|---|---|---|
| Product Composition | 7.6% C₂ / 93.4% C₃ / Alt. feed | 10% poly C₂ / 90% poly C₃ / Mech. blend | 5% C₂ / 95% C₃ / Uniform feed | 5% C₂ / 95% C₃ / Alt. feed | 5% C₂ / 95% C₃ / Alt. feed | 5% C₂ / 95% C₃ / Uniform feed |
| Density | 0.9023 | 0.9047 | 0.879 | 0.887 | 0.8850 | 0.8727 |
| Tensile properties: |  |  |  |  |  |  |
| Strength, yield (p.s.i.) | 1,845 | 4,235 | -------- | -------- | 1,499 | 503 |
| Strength, break (p.s.i.) | 2,736 | 2,692 | -------- | -------- | 2,418 | 1,721 |
| Percent elongation, yield | 30 | 15 | -------- | -------- | 35 | 40 |
| Percent elongation, break | 675 | 478 | -------- | -------- | 540 | 790 |
| Impact strength (ft.lbs./in.) | 13.5 | 0.8 | -------- | -------- | 9.40 | 2.77 |
| Melt index | 0.10 | -------- | 0.52 (220° C.) | 0.19 (220° C.) | -------- | -------- |
| Clash, Berg modulus data: |  |  |  |  |  |  |
| T_f modulus, 135,000 p.s.i. (° C.) | −9 | -------- | −20.5 | 7.5 | −12.5 | −28.5 |
| T_2000 modulus, 2,000 p.s.i. (° C.) | 125 | -------- | 77.0 | 112.5 | 98.0 | 48.0 |
| Stifflex range | 134 | -------- | 97.5 | 120.0 | 110.5 | 76.5 |
| 25° modulus (p.s.i.) | 55,000 | -------- | 19,000 | 53,000 | 24,000 | 4,700 |
| Brittleness temperature, ° C. (50% failure) | −25--30 | (⁴) | −38.5 | −17 | −21 | −49 |

|  | Ex. 13 | Ex. 14 | Ex. 15 | Ex. 16 | Ex. 17 | Ex. 18 |
|---|---|---|---|---|---|---|
| Product composition | 5.3% C₂ / 94.7% C₃ / Alt. feed | 5.3% C₂ / 94.7% C₃ / Alt. feed | 5.3% C₂ / 94.7% C₃ / Alt. feed | 17% C₂ / 83% C₃ / Alt. feed | 90% C₂ / 10% C₃ / Alt. feed | 90% C₂ / 10% C₃ / Uniform feed |
| Density | 0.9009 | 0.9097 | 0.9254 | -------- | 0.937 | 0.930 |
| Tensile properties: |  |  |  |  |  |  |
| Strength, yield (p.s.i.) | 2,710 | 3,157 | 2,968 | -------- | 2,763 | -------- |
| Strength, break (p.s.i.) | 2,446 | 1,997 | 1,912 | -------- | 1,360 | 1,836 |
| Percent elongation, yield | 32 | 20 | 18 | -------- | 17 | -------- |
| Percent elongation, break | 69 | 330 | 253 | -------- | 233 | 15 |
| Impact strength (ft.lbs./in.) | 4.0 | 2.2 | 3.7 | -------- | -------- | -------- |
| Melt index | 0.05 | 0 | 0 | -------- | 0.29 | 0.62 |
| Clash, Berg modulus data: |  |  |  |  |  |  |
| T_f modulus, 135,000 p.s.i. (° C.) | −2.5 | 12.5 | 10.0 | −21.5 | −12.0 | −18 |
| T_2000 modulus, 2,000 p.s.i. (° C.) | 124.5 | 134.0 | 133.5 | 84.0 | 119.5 | 102.5 |
| Stifflex range | 127.0 | 121.5 | 123.5 | 105.5 | 131.5 | 120.5 |
| 25° modulus (p.s.i.) | 64,000 | 105,000 | 98,000 | 21,000 | -------- | -------- |
| Brittleness temperature (50% failure) | (⁵) | 2.5 | −2.5 | −38 | -------- | -------- |

¹ No break.  ² No break at −75° C.  ³ 60% failure at −25.  ⁴ 100% failure at −5.  ⁵ 100% break at −20.

By the practice of our invention ethylene/propylene interpolymers can be tailored to meet various processing demands. These new copolymers achieve performance levels heretofore beyond reach of polyblends and uniform copolymers. While there are, of course, specific uses for the polyblends, an added costly processing step is required for their preparation. The copolymers prepared by feeding uniform monomer mixtures have also been adapted to certain specific applications. However, the polymers prepared according to our process are not limited by processing steps, or economical considerations as in the case of the polyblends, nor are they limited to low crystallinity properties that characterize the copolymers prepared by the usual uniform feed techniques. Copolymers prepared by the usual, or common, procedure whereby two monomers are fed to the polymerization zone as a uniform mixture or as concomitant streams are characteristically atactic in structure and are soluble in many organic solvents.

Since the novel copolymers of our invention have very low extractability with organic solvents, a wide range of application is available for them. We can use these products as films in wrapping articles, such as foodstuffs that are stored at low temperature where the film must have high strength and good resistance to solvent action. Our novel copolymers can be used in the manufacture of injection moldings, extrusion moldings, and in electrical applications for insulation purposes. In general, we can use the new products of our invention advantageously in place of linear polyethylene or crystalline polypropylene.

In many applications such substitution of our new products results in a definitely superior performance.

While the invention has been described with particular reference to preferred embodiments thereof, it will be appreciated that variations from the details given herein can be effected without departing from the invention in its broadest aspects.

We claim:

1. A method of preparing interpolymers of ethylene and propylene in the presence of a catalyst prepared by the interaction of (a) a halide of vanadium with (b) an aluminum compound of the general formula RAlXY, wherein R is selected from the group consisting of alkyl, cycloalkyl and aryl radicals, X is selected from the group consisting of hydrogen, halogen, alkyl, cycloalkyl, and aryl radicals, and Y is selected from the group consisting of hydrogen, halogen, alkyl, cycloalkyl, and aryl radicals, which comprises regulating the supply of said ethylene and propylene to the polymerization zone within limits to produce a copolymer wherein one of said monomers is combined in at least 75 weight percent of said polymer, wherein said regulating step comprises intermittently feeding the monomer used in the minor proportion to obtain thereby a varying proportion of said monomer in the polymerization zone and so that at intervals the monomer used in predominant proportions is substantially the sole monomer available for polymerization.

2. The method of claim 1 wherein both monomers are fed alternately to the polymerization zone.

3. The method of preparing interpolymers according to claim 1 whereby the monomer making up the predominant proportion of the product polymer and representing at least 75 weight percent of the polymer weight is propylene.

4. The method of preparing interpolymers according to claim 1 wherein a polymeric product containing said two monomers in a weight ratio of at least 3 to 1 is prepared, in which the monomer employed in the minor proportion is fed into the reactor for 0.5 to 180 seconds duration during each feed cycle, said cycle being of not less than 20 seconds and not more than 20 minutes in length, wherein the duration of said intermittent monomer feed extends for not more than 50 percent of said feed cycle.

5. A process for preparing ethylene/propylene interpolymers in the presence of a catalyst prepared by the reaction of (a) a trialkylaluminum with (b) a halide of vanadium wherein said interpolymer comprises 75 to 98 percent polymerized ethylene and 25 to 2 percent polymerized propylene, said process comprising continuously feeding ethylene monomer to the polymerization zone and intermittently feeding propylene to the polymerization zone for 0.5 to 180 seconds during each feed cycle, the time of said cycle being from 30 seconds to 20 minutes, wherein the duration of said propylene feed is less than 50 percent of said feed cycle.

6. A process for preparing ethylene/propylene interpolymers in the presence of a catalyst prepared by the reaction of (a) a trialkylaluminum with (b) a halide of vanadium wherein said interpolymer comprises 75 to 98 percent polymerized ethylene and 25 to 2 percent polymerized propylene, said process comprising feeding ethylene and propylene alternately to the polymerization zone, wherein said propylene feed is continued for 0.5 to 180 seconds during each feed cycle, the time of said cycle being from 30 seconds to 20 minutes, wherein the duration of said propylene feed is less than 50 percent of said feed cycle.

7. The process for preparing ethylene/propylene interpolymers having a broader Stifflex range than crystalline polypropylene, by the copolymerization of ethylene and propylene in the presence of a catalyst prepared by the reaction of (a) a halide of vanadium with (b) an aluminum compound of the general formula RAlXY, wherein R is selected from the group consisting of alkyl, cycloalkyl, and aryl radicals and X and Y are selected from the group consisting of hydrogen, halogen, alkyl, cycloalkyl and aryl radicals, wherein said interpolymers comprise 75 to 98 percent polymerized propylene and 25 to 2 percent polymerized ethylene, said process comprising feeding propylene continuously to the polymerization zone and feeding ethylene intermittently to the polymerization zone for 0.5 to 180 seconds during each cycle, each of said cycles extending from 30 seconds to 20 minutes, wherein the duration of said ethylene feed is less than 50 percent of the time of said cycle, and isolating said interpolymers from said catalyst.

8. The process for preparing ethylene/propylene interpolymers having a broader Stifflex range than crystalline propylene, by the copolymerization of ethylene and propylene in the presence of a catalyst prepared by the reaction of (a) a halide of vanadium with (b) an aluminum compound of the general formula RAlXY, wherein R is selected from the group consisting of alkyl, cycloalkyl, and aryl radicals and X and Y are selected from the group consisting of hydrogen, halogen, alkyl, cycloalkyl and aryl radicals, wherein said interpolymers comprise 75 to 98 percent polymerized propylene and 25 to 2 percent polymerized ethylene, said process comprising feeding propylene monomer and ethylene monomer alternately to the polymerization zone, wherein ethylene feed is continued for 0.5 to 180 seconds during each cycle, each of said cycles extending from 30 seconds to 20 minutes, wherein the duration of said ethylene feed is less than 50 percent of the time of said cycle, and isolating said interpolymers from said catalyst.

9. A process of preparing block copolymers from ethylene and propylene monomers which comprises alternately polymerizing one of said monomers and a mixture of said monomers in the presence of a catalyst comprising a vanadium chloride and an aluminum alkyl compound.

References Cited

UNITED STATES PATENTS

| | | | |
|---|---|---|---|
| 2,420,330 | 5/1947 | Schriver et al. | 260—85.5 C |
| 2,460,300 | 2/1949 | LeFevre et al. | 260—45.5 A |
| 2,846,427 | 8/1958 | Findlay | 260—94.3 |
| 2,910,461 | 10/1959 | Nowlin et al. | 260—94.3 |

FOREIGN PATENTS

| | | | |
|---|---|---|---|
| 553,720 | 6/1957 | Belgium | 260—45.5 A |

OTHER REFERENCES

Natta: Journal of Polymer Science, 34, pp. 531–49 (January 1959).

Natta et al.: La Chimica e L'Industria, 39, pp. 733–743 (September 1957).

Stewart: Science, 124, p. 1257 (December 1956).

JAMES A. SEIDLECK, Primary Examiner

A. HOLLER, Assistant Examiner

U.S. Cl. X.R.

260—88.2 R